United States Patent

[11] 3,576,389

[72] Inventors Kenichi Sasaki
Tokyo;
Kazunori Nishi, Kanagawa-Ken, Japan
[21] Appl. No. 703,290
[22] Filed Feb. 6, 1968
[45] Patented Apr. 27, 1971
[73] Assignee Sony Corporation
Tokyo, Japan

[54] AUTOMATIC COLOR CONTROL CIRCUIT

3 Claims, 2 Drawing Figs.

[52] U.S. Cl. .......... 178/5.4AC
[51] Int. Cl. .......... H04n 9/48
[50] Field of Search .......... 178/5.4, 5.4 (ACC)

[56] References Cited

UNITED STATES PATENTS 2,908,748 10/1959 Macouski .......... 178/5.4(ACC)
2,971,050 2/1961 Kelly et al. .......... 178/5.4(ACC)
3,141,064 7/1969 Macovski .......... 178/5.4(ACC)
3,209,071 9/1965 Bradley .......... 178/5.4(ACC)
3,109,887 11/1970 Bradley .......... 178/5.4(ACC)

*Primary Examiner*—Robert L. Griffin
*Assistant Examiner*—Richard P. Lange
*Attorneys*—Albert C. Johnston, Robert E. Isner, Lewis H. Eslinger and Alvin Sinderbrand

ABSTRACT: In an automatic color control circuit for color television receivers, color burst signals separated from the output of a carrier chrominance signal amplifier are rectified to produce a control signal for varying the gain of the amplifier inversely with respect to the control signal, and the control signal is suppressed, as by the application to the rectifier circuit of a reverse bias which varies inversely with the burst signals, so as to reduce the amplifier gain from its maximum level only when the input chrominance signals, and hence the burst signals separated therefrom, are at least at predetermined levels.

PATENTED APR 27 1971

3,576,389

Figures 1, 2:
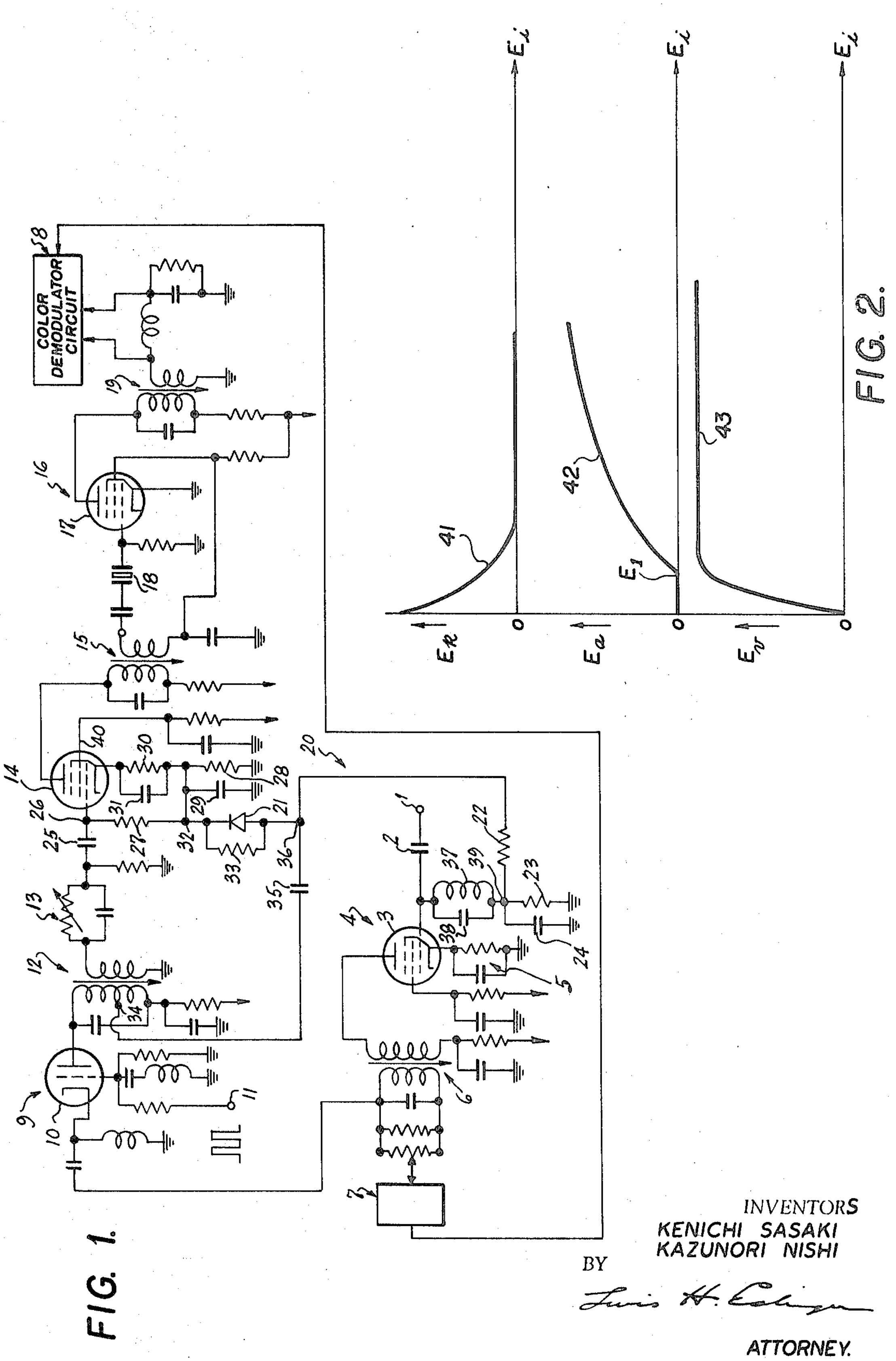

INVENTORS
KENICHI SASAKI
KAZUNORI NISHI

BY

ATTORNEY.

AUTOMATIC COLOR CONTROL CIRCUIT

This invention relates to an automatic color control circuit suitable for use in color television receivers or the like, and more particularly is directed to an automatic color control circuit adapted to provide constantly good subjective color quality of the reproduced images independently of the conditions for receiving signals from several transmitting stations.

In seeking to prevent or eliminate changes in the color quality of the reproduced images by reason of variations of antenna gain for the reception of signals from different stations and variations of gain in the chrominance channel relative to the luminance channel, existing color television receivers employ an automatic color (or chrominance) control (ACC) circuit of the type in which the gain of a carrier chrominance signal amplifier is varied with the amplitude of color burst signals to provide chrominance signals of constant amplitude at all times. However, with that conventional type of automatic color control circuit, instability may be introduced in the output of the chrominance signal amplifier due to the fact that such circuit seeks to vary the gain of the amplifier according to changes in the amplitude of the color burst signals at all times, and hence even when the input chrominance signals are at a low level. Thus, the conventional type of automatic color control circuit can respond satisfactorily to variations in the amplitude or level of the chrominance signals over only a relatively limited range.

Accordingly, it is an object of the present invention to provide an automatic color control circuit for use in color television receivers to afford color images of constantly good color quality irrespective of the station or channel to which the receiver is tuned and hence irrespective of the level of the input chrominance signals within a relatively wide range.

Another object is to provide a carrier chrominance signal amplifier which is controlled to produce color burst signals of a substantially constant amplitude sufficient to drive a color burst oscillator even when the input chrominance signals are at a low level.

According to an aspect of the invention, the gain of a carrier chrominance signal amplifier is maintained constant at a high or maximum level so long as the amplitude of the input chrominance signals is less than a predetermined value and, only in the event that the amplitude of the input chrominance signal is in excess of such predetermined value, the gain of the amplifier is progressively reduced in proportion to such excess for maintaining the output of the chrominance signal amplifier substantially constant for a relatively wide range of variations in the amplitude of the input chrominance signals.

In a preferred automatic color control circuit according to the invention, a color burst signal separated from the output of the chrominance signal amplifier is fed to a rectifier circuit having applied thereto a reverse bias which varies inversely with the amplitude of the color burst signal so that a control signal for reducing the gain of the chrominance signal amplifier from its maximum or high level is produced as the rectified output of the rectifier circuit only when the separated color burst signals exceed the inversely varied reverse bias, and hence only when the input chrominance signals are at levels above a predetermined value.

The above, and other objects, features and advantages of the invention, will be apparent in the following detailed description of an illustrative embodiment thereof which is to be read in connection with the accompanying drawing, wherein:

FIG. 1 is a wiring diagram of an automatic color control circuit according to one embodiment of this invention; and FIG. 2 is a graph illustrating the relationship of various voltages to the level of the input chrominance signals in the circuit of FIG. 1.

Referring to FIG. 1 in detail, it will be seen that, in an automatic color control circuit according to this invention as there illustrated, carrier chrominance signals received by an input terminal 1 are applied through a coupling capacitor 2 to the control grid of a vacuum tube 3 included in a first band-pass amplifier circuit 4 for amplifying the carrier chrominance signals. The cathode of tube 3 is grounded through a bypass circuit 5, and its anode is connected through an output transformer 6 to a second band-pass amplifier circuit 7 through which the amplified output of amplifier circuit 4 is fed to a color demodulator circuit 8.

A circuit 9 for separating color burst signals from the carrier chrominance signals may employ a vacuum tube 10, as shown, having its cathode supplied with a portion of the amplified chrominance signals from the secondary winding of output transformer 6, and its control grid supplied with a gate pulse which is synchronized with a horizontal synchronizing signal applied to a terminal 11. The separated color burst signals are fed from the anode of tube 10 through an output transformer 12 and a phase shifter circuit 13 for color phase control to a color burst signal amplifying tube 14. The color burst signals amplified by tube 14 are fed through an output transformer 15 to a crystal controlled color subcarrier oscillator circuit 16 shown to include an oscillation tube 17 and a quartz oscillator 18 for synchronous control thereby. The output of color subcarrier oscillator circuit 16 is applied through a transformer 19 to color demodulator circuit 8.

In accordance with the present invention, the gain of the first band-pass amplifier 4 is maintained at a constant maximum or high level so long as the carrier chrominance signals received at terminal 1 are below a predetermined level and, in the event that the amplitude of the chrominance signal is in excess of that predetermined level, the gain of amplifier 4 is progressively reduced in proportion to such excess for maintaining the output of amplifier 4 substantially constant over a relatively wide range of variations in the amplitude of the chrominance signal. Preferably, the foregoing is achieved by providing a rectifier circuit 20 to which a portion of the color burst signal is fed for rectification thereby, applying to the rectifier circuit, as a reverse bias, a voltage which varies inversely with the amplitude of the color burst signal so that the color burst signal is rectified only to the extent that it exceeds such reverse bias voltage, and biasing the chrominance signal amplifier 4 by a control signal corresponding to the rectified color burst signal so that the gain of amplifier 4 is reduced from its maximum or high level only when the color burst signal exceeds the inversely varied reverse bias voltage applied to rectifier circuit 20 and is thus rectified to produce the control signal.

In the illustrated embodiment of the invention, the rectifier circuit 20 is shown to include a diode 21 constituting the burst signal rectifying element and having its anode grounded through a resistor 22 and a load resistor 23 with a charging capacitor 24 connected in parallel with load resistor 23. The tube 14 for amplifying the separated color burst signal is connected in a grid bias system by interposing a coupling capacitor 25 between phase shifter circuit 13 and the control grid of tube 14, and by connecting the junction 26 between capacitor 25 and the control grid to ground through a grid leak resistor 27 and a parallel circuit of a resistor 28 and bypass condenser 29. Further, the cathode of amplifying tube 14 is connected to ground through a parallel circuit of a resistor 30 and a capacitor 31 and through resistor 28. The time constant of capacitor 25 and grid leak resistor 27 is selected so as to be substantially greater than each horizontal period. With the foregoing arrangement associated with amplifying tube 14, an increase in the input signal level causes an increase in the grid leak current which increases the bias of tube 14 and thus provides a grid leak bias.

The cathode of diode 21 is connected to a junction 32 between grid leak resistor 27 and resistor 28, and a resistor 33 of high resistance value may be connected in parallel with diode 21. Further, in order to apply the color burst signal to the rectifier circuit 20 constituted by diode 21, resistors 22, 23 and 28 and ground, an intermediate point 34 of the primary winding of output transformer 12 of burst signal separating circuit 9 is connected through a coupling capacitor 35 to a junction point 36 between rectifying diode 21 and resistor 22. The control signal produced in circuit 20 by rectification of the color burst signals therein is applied, as a bias, to first band-pass amplifier circuit 4 through a parallel circuit constituted by a resistor 37 and capacitor 38 and extending from a junction point 39 between resistors 22 and 23 to the control grid of amplifying tube 3 so that the control signal affects the high pass characteristics of amplifier circuit 4.

In order for the separated burst signal amplifying tube 14 to function as a limiter amplifier, the potential of its screen grid 40 may be reduced to a low value, thereby to permit the application to the color subcarrier oscillator circuit 16 of the color burst signal of substantially constant amplitude. Further, the resistance value of resistor 30 may be made sufficiently small to avoid the imposition of a zero bias condition on amplifying tube 3.

In the operation of the above described automatic color control circuit according to this invention, a DC current from the cathode of amplifying tube 14 is fed to resistor 28 to produce a voltage $E_k$ which is applied to rectifying diode 21 as a reverse bias. As a result of the foregoing, diode 21 rectifies only that part of the color burst signal fed from burst separator circuit 9 to rectifier circuit 20 which is greater than $E_k$, and the resulting rectified output or control signal produced across load resistor 23 is through the parallel circuit of resistor 37 and capacitor 38, to a bias circuit of amplifying tube 3 for controlling the gain of first band-pass amplifier circuit 4.

When the level of the chrominance signal applied to input terminal 1 is low, the level of the separated color burst signal is also low, and hence a large DC current flows to the cathode of tube 14 and a correspondingly large voltage $E_k$ is established across resistor 28 and applied as a reverse bias to diode 21. Thus, the color burst signal fed to circuit 20 is hardly rectified, if at all, and the corresponding control signal produces little if any biasing of first band-pass amplifier 4 so that the latter maintains its gain at or near the maximum level for full amplification of the low level chrominance signal.

On the other hand, when the chrominance signal level is high, the burst signal level is also high and the DC current flowing in amplifying tube 14 is reduced by the grid leak bias of capacitor 25 and resistor 27 to correspondingly reduce the voltage $E_k$ across resistor 28. Therefore, simultaneously with the increase in the separated color burst signal fed to rectifier circuit 20 there is a decrease in the reverse bias applied to the rectifying diode 21, whereby the color burst signal is sufficiently rectified to produce a relatively large control signal across resistor 23, which control signal substantially biases first band-pass amplifier circuit 4 to reduce the gain thereof and ensure that the amplified chrominance signal at the output of circuit 4 remains at a substantially constant level.

Referring now to FIG. 2, it will be seen that there is plotted thereon a curve 41 representing the variation of the voltage $E_k$ across resistor 28 which is applied as a reverse bias to diode 21 as a function of the level of the chrominance signal $E_i$ applied to input terminal 1; a curve 42 representing the variation of the rectified voltage $E_a$ established across load resistor 23 and constituting the control signal to vary the gain of amplifier circuit 4 as a function of the level of the input chrominance signal $E_i$; and a curve 43 representing the level of the output $E_v$ of amplifier circuit 4 as a function of the level of the input chrominance signal $E_i$ thereto. As is apparent from curve 41, the voltage $E_k$ is relatively great when the level of the input chrominance signal $E_i$ is small, and the voltage $E_k$ rapidly decreases as the level of signal $E_i$ is increased. Until the input signal $E_i$ reaches a predetermined level indicated at $E_1$ on curve 42, the voltage $E_k$, and hence the reverse bias applied to rectifying diode 21, exceeds the relatively small separated color burst signal fed to rectifier circuit 20 so that the control signal $E_a$ from circuit 20 remains at zero. The fully suppressed or zero control signal $E_a$ from circuit 20 leaves unaffected the gain of amplifier circuit 4 so that input chrominance signals $E_i$ at levels below $E_1$ are subject to the full or maximum amplification by circuit 4. When the level of the input chrominance signal $E_i$ exceeds the predetermined value $E_1$, the reverse bias $E_k$ applied to diode 21 is decreased below the increasing level of the separated color burst signal so that there is provided an increasing rectified output or control signal $E_a$ from circuit 20. As the control signal $E_a$ increases with increasing levels of the input signal $E_i$ above value $E_1$, the gain of first band-pass amplifier circuit 4 is progressively reduced to maintain a substantially constant output level from amplifier circuit 4, as shown by curve 43.

Since the above described automatic color control circuit according to this invention applies to the rectifier circuit 20 a reverse bias and a separated color burst signal at levels which vary oppositely with changes in the level of the input chrominance signal below the value $E_1$, it is possible to provide a great gain in amplifier circuit 4 for a low input chrominance signal, and hence for a low burst signal level, and also to provide a very small gain in the amplifier circuit 4 when the level of the input chrominance signal, and hence of the color burst signal, is high. Accordingly, the chrominance signal and the color burst signal at the output of amplifier circuit 4 can be maintained substantially constant at high levels for input chrominance signals varying over a wide range. By reason of the foregoing, a color burst signal at a substantially high and constant level is always available for application to the color subcarrier oscillator circuit 16 to directly accomplish synchronous control of such circuit 16 and provide a stable synchronized oscillation output therefrom. Thus, there is no need to resort to those circuits of the prior art in which the synchronous control of the color subcarrier oscillator circuit is based on a phase comparison of the color burst signal with the oscillator circuit output. In tests conducted with an automatic color control circuit according to this invention, as described above, it has been possible to limit variations in the output of the first band-pass amplifier circuit 4 to within 3db. for variations of the input chrominance signal $E_i$ of approximately 12db.

In the illustrated embodiment of the invention, the DC voltage established across resistor 28 and applied to diode 21 as a reverse bias is obtained from the cathode of amplifying tube 14. However, a DC voltage varying inversely with the color burst signal can be obtained from another electrode of tube 14, for example, from its anode. In the latter case, it is only necessary that the variations of the DC voltage thus obtained be inverted in phase, as by a DC amplifier, prior to the application thereof to the anode side of diode 21. It is also apparent that the described burst signal separator circuit 9 and burst signal amplifier circuit 14 constituted by vacuum tube circuits may be replaced by similarly acting transistorized or solid state circuits.

Although a specific embodiment of the invention has been described above with reference to the accompanying drawing and mention has been made of particular modifications thereof, it is to be understood that the invention is not limited to that precise embodiment or the mentioned modifications thereof, and that various changes and further modifications may be effected therein by one skilled in the art without departing from the scope or spirit of the invention as defined in the appended claims.

I claim:

1. In an automatic color control circuit, the combination of amplifier means for amplifying carrier chrominance signals supplied as an input thereto and having a variable gain that is reducible from a maximum high level, separating means for separating color burst signals from the amplified chrominance signals at the output of said amplifier means, rectifier circuit means for rectifying said color burst signals to produce a control signal representative of the amplitude of said color burst signals, circuit means producing a voltage varying inversely with respect to the amplitude of said color burst signals and which is impressed as a reverse bias on said rectifier circuit means so that the production of said control signal by said rectifier circuit means is suppressed when said burst signals are of an amplitude corresponding to input chrominance signals at a level below a predetermined value, and means for impressing said control signal on said amplifier means to proportionately reduce said gain of the latter from said maximum high level thereof only when the input chrominance signals are at a level above said predetermined value.

2. An automatic color control circuit according to claim 1 in which said circuit means producing a voltage impressed as reverse bias on said rectifier circuit means includes amplifier means for amplifying the separated color burst signals and being connected in a grid bias system to define a source of a DC current varying inversely with respect to the amplitude of said color burst signals, and a resistor connected with said source of DC current and with said rectifier circuit means to have said voltage established across said resistor and impressed on said rectifier circuit means.

3. An automatic color control circuit according to claim 1 in which the amplified color burst signals directly effect synchronous drive of a color subcarrier oscillator circuit means.